(12) United States Patent
Covell et al.

(10) Patent No.: US 11,653,071 B2
(45) Date of Patent: May 16, 2023

(54) RESPONSIVE VIDEO CONTENT ALTERATION

(71) Applicant: International Business Machines Corporation, Armonk, NY (US)

(72) Inventors: Jacob Thomas Covell, New York, NY (US); Thomas Jefferson Sandridge, Tampa, FL (US); Alan Chung, Hopewell Junction, NY (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/483,218

(22) Filed: Sep. 23, 2021

(65) Prior Publication Data

US 2023/0091912 A1 Mar. 23, 2023

(51) Int. Cl.
| | | |
|---|---|---|
| *H04N 21/81* | (2011.01) | |
| *H04N 21/44* | (2011.01) | |
| *G06N 20/00* | (2019.01) | |
| *G06T 13/20* | (2011.01) | |
| *H04N 21/442* | (2011.01) | |
| *H04N 21/45* | (2011.01) | |
| *G06T 13/40* | (2011.01) | |

(52) U.S. Cl.
CPC ......... *H04N 21/8146* (2013.01); *G06N 20/00* (2019.01); *G06T 13/205* (2013.01); *G06T 13/40* (2013.01); *H04N 21/44008* (2013.01); *H04N 21/44213* (2013.01); *H04N 21/4532* (2013.01)

(58) Field of Classification Search
CPC ......... H04N 21/8146; H04N 21/44008; H04N 21/44213; H04N 21/4532; G06N 20/00; G06T 13/205; G06T 13/40
See application file for complete search history.

(56) References Cited

U.S. PATENT DOCUMENTS

| | | | |
|---|---|---|---|
| 11,045,271 B1 | 6/2021 | Tran | |
| 2007/0154168 A1* | 7/2007 | Cordray | ................... H04N 5/91 |
| 2008/0165388 A1* | 7/2008 | Serlet | ........................ H04N 1/40 |
| 2011/0102674 A1* | 5/2011 | Mertens | ................... H04N 9/74 |

(Continued)

FOREIGN PATENT DOCUMENTS

TW I235344 B 7/2005

OTHER PUBLICATIONS

"AI-Powered Communication Engine with Intelligent Routing and Dynamic Conversation Techniques," IP.Com, An IP.com Prior Art Database Technical Disclosure, IP.com No. IPCOM000264537D, IP.com Electronic Publication Date: Jan. 4, 2021, 7 pages.

(Continued)

*Primary Examiner* — Anthony Bantamoi
(74) *Attorney, Agent, or Firm* — Donald J. O'Brien

(57) ABSTRACT

A first user input is detected from a client device. The first user input is directed at a video content that includes a set of one or more topics, the first user input is from a viewer of the video content. A set of one or more frames in the video content is analyzed based on the first user input. A first topic in the video content is identified based on the set of frames and based on the viewer. The video content, related to the first topic of the set of topics, is altered based on the set of frames and based on the viewer.

20 Claims, 6 Drawing Sheets

(56) References Cited

U.S. PATENT DOCUMENTS

| | | | | |
|---|---|---|---|---|
| 2017/0186331 | A1* | 6/2017 | Lawrenson | G09B 5/065 |
| 2018/0232928 | A1* | 8/2018 | Grant | G06T 13/40 |
| 2019/0213899 | A1* | 7/2019 | Erickson | G09B 5/12 |
| 2019/0297381 | A1* | 9/2019 | Chung | H04N 21/442 |
| 2020/0007916 | A1* | 1/2020 | Keen | H04N 21/251 |
| 2020/0356712 | A1 | 11/2020 | Sfar et al. | |
| 2020/0356899 | A1 | 11/2020 | Sfar et al. | |
| 2021/0366300 | A1* | 11/2021 | Bramlet | G09B 5/065 |

OTHER PUBLICATIONS

"Contextually Correlated Personalization Method to Maximize User Experience Perfomnance," IP.Com, An IP.com Prior Art Database Technical Disclosure, IP.com No. IPCOM000265768D, IP.com Electronic Publication Date: May 12, 2021, 6 pages.

"Location Prediction for Image and Video Content Based on Microfeatures," IP.Com, An IP.com Prior Art Database Technical Disclosure, IP.com No. IPCOM000263226D, IP.com Electronic Publication Date: Aug. 7, 2020, 4 pages.

"Deep Learning for Digital Content Creation," Dell Technologies, Course Overview, Printed Sep. 15, 2021, 2 pages.

Lather, "CANs: Creative Adversarial Networks," Generating Art By Learning About Styles and Deviating From Style Norms, Printed Sep. 15, 2021, 21 pages.

Brownlee, "A Gentle Introduction to Generative Adversarial Networks (GANs)," Machine Learning Mastery, Last Updated Jul. 19, 2019, 30 pages, https://machinelearningmastery.com/what-are-generative-adversarial-networks-gans/.

"Leveraging education technology helps drive better learning experiences and outcomes.," IBM Industries, Printed Sep. 15, 2021, 8 pages, https://www.ibm.com/industries/education.

"Addressing the skills challenge with P-TECH schools," IBM, IBM Institute for Business Value, Printed Sep. 15, 2021, 1 page, https://www.ibm.com/thought-leadership/institute-business-value/report/ptechschools.

"The digital learning platform model is reinventing talent development," IBM, IBM Institute for Business Value, Printed Sep. 15, 2021, 1 page, https://www.ibm.com/thought-leadership/institute-business-value/report/digitallearning.

"Until Learning has no Limits," Cast, Printed Sep. 15, 2021, 4 pages, www.cast.org.

McKay, "Personalized Learning: Tailoring Lessons for every Learning Style," EdTech Team, Oct. 7, 2017, 6 pages, https://www.edtechteam.com/blog/2017/10/personalized-learning-tailoring-lessons-every-learning-style/.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

RESPONSIVE VIDEO CONTENT ALTERATION

BACKGROUND

The present disclosure relates to audio-video media, and more specifically, to altering video content for consumption by a user.

Audio-video media may be generated for consumption by an audience of viewers. Audio-video media may include video content hosted on servers and accessible by web-browsers. Video content may be generated once and may include information consumable by a variety of users.

SUMMARY

According to embodiments, disclosed are a method, system, and computer program product.

A first user input is detected from a client device. The first user input is directed at a video content that includes a set of one or more topics, the first user input is from a viewer of the video content. A set of one or more frames in the video content is analyzed based on the first user input. A first topic in the video content is identified based on the set of frames and based on the viewer. The video content, related to the first topic of the set of topics, is altered based on the set of frames and based on the viewer.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
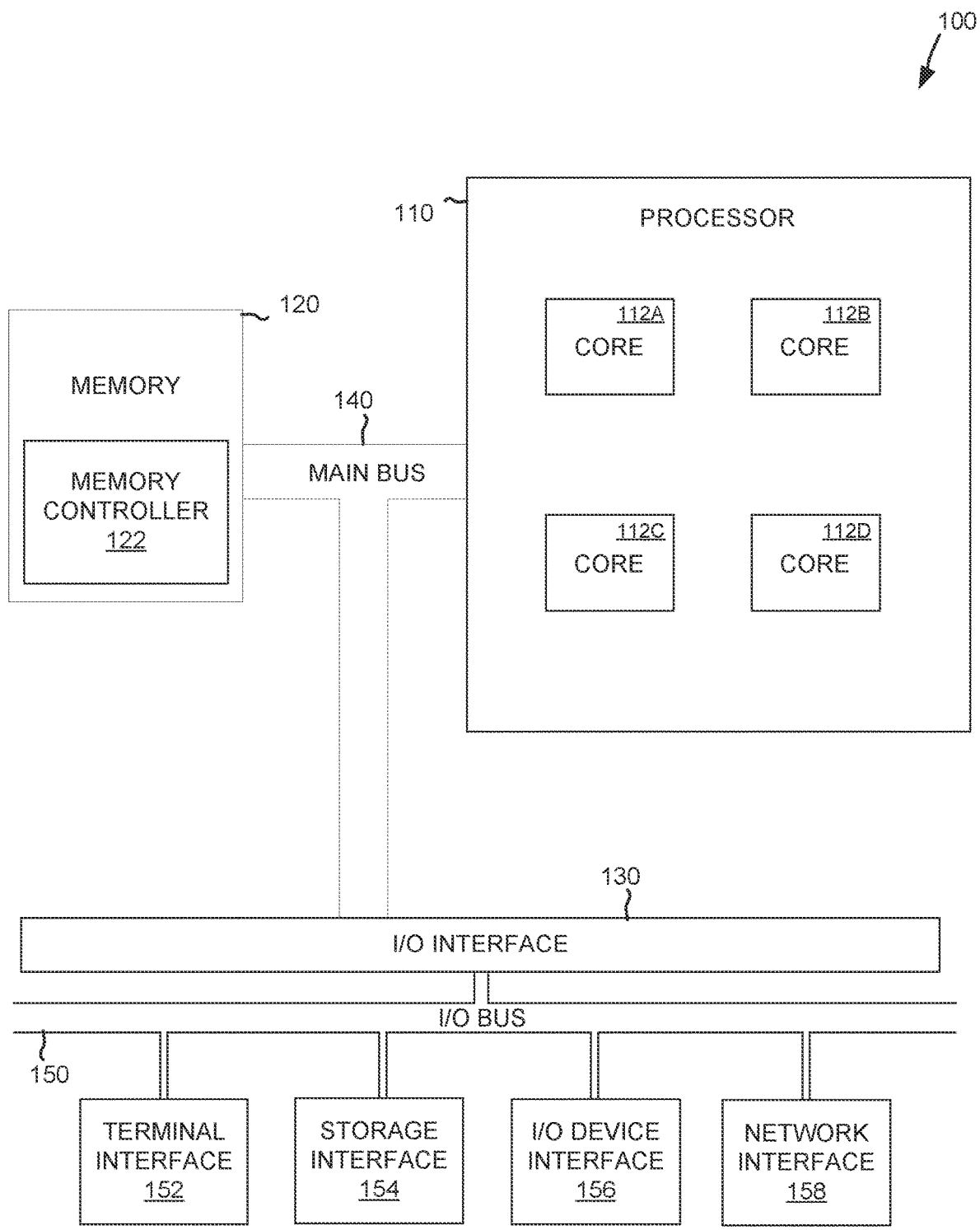
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to audio-video media, more particular aspects relate to altering video content for consumption by a user. While the present disclosure is not necessarily limited to such applications, various aspects of the disclosure may be appreciated through a discussion of various examples using this context.

With an increased abundance of computers and digital cameras, more and more users have access to video content. For example, many users may use computers to view or consume content, such as music, movies, and other media. In another example, many users may be content creators that use computers and digital cameras to create videos for consumption by viewers. Video content may be hosted by various servers across networks such as the Internet, and with the proliferation of video content, additional use cases are emerging. For purposes of the disclosure, video content may be multimedia content that includes at least a visual portion (e.g., pixels, graphics, vectors, etc.). In some embodiments, video content may also include audio (e.g., sound effects, speech, recordings of real-world examples, etc.).

One area of increased activity is that of instructional or informational video content. Such video content may be consumed by viewers to learn or comprehend information. Video content may be beneficial for viewers in that they may use a web-browser and access content remotely. Video content may also be beneficial for viewers in that they may access content in a time-shifted fashion. Specifically, a user may be able to watch or consume a video at a later date (e.g., hours, months) after the video was created and uploaded. Video content may also be beneficial for content creators in that they can increase the access for users. Specifically, content creators can create an informational video once, and distribute it for consumption many times after the creation and distribution. With the ability to generate information such as text and images once, and to provide this information to viewers many times, a content creator can increase their productivity. For example, instead of communicating the same information manually every time, a content creator can instead create video content once, and focus on creating other video content that is related to other subjects, and/or provides additional detail or information.

Video content has drawbacks that can limit its appeal and usefulness, however. For instance, different users may learn in different ways. However, video content can be rigid in structure, pacing, and content. For example, a first user may understand a first topic in a more real-time or moment to moment setting. The first user may gain a better understand by having information presented on the first topic in a linear and detailed fashion, providing information in a step-by-step fashion (e.g., an instructor explaining, introducing portions of the first topic slowly). In a second example, a second user may understand a first topic very quickly and may not have the patience or attention to intently watch an instructor slowly provide each detail of the first topic. In some cases, a user may decide to learn a topic by listening to a presentation that has a general amount of detail, and intermittently ask a presenter a specific question about a particular detail or portion of the presentation.

However, video content may fail to provide for the variety of learning styles with video content. Specifically, video content may be of a fixed scope, layout, and/or arrangement. Topics may be covered only at a fixed rate. Content creators may be limited by time or ability to feasibly serve all consumers of video content. A content creator, for example, may only be able to create one or two videos for a particular topic or set of topics. The content creator may then have to target a narrow knowledge base, and consequently, the video content may be viewed by fewer individuals. Additionally, users may suffer due to fixed video content that exists. Specifically, some viewers may obtain an incomplete understanding of a topic from a single video. Viewers may perform searching and viewing of multiple videos if they want to adequately understand a topic.

Responsive video content alteration ("RVCA") may provide advances to the creation, deployment, hosting, searching, and consumption of video content ("videos"). RVCA may operate to identify topics in videos. Specifically, the RVCA may be configured to perform an analysis on a particular portion of video content, such as one or more video frames of a video file. The analysis may be a relevant image analysis or machine learning technique, configured to identify the content in the video. The content that may be identified based on the analysis may be illustrations, equations, symbols, strings of text, and other relevant characters, symbols, or depictions. The content that may be identified based on the analysis may include content outside of the video content. Specifically, the content may include audio content (e.g., audio tracks, voice overs, a narrator, etc.). For example, analysis may include performing a machine learning technique to parse an audio narration. The content that may be identified based on the analysis may include metadata related to the video. For example, the RVCA may operate to analyze a closed captioning, transcript, description, tags, or other relevant metadata associated with the video content.

Further, and based on a particular viewer, the RVCA may be configured to alter video content. Specifically, the RVCA may alter the displayed content such that each viewer may receive a more user-specific video, such as by performing machine learning to generate synthetic media. The altered video may be condensed or lengthened depending on the needs of the user. For example, a first user may be a viewer of content that has an above average understanding of a first topic. Based on identifying the first topic, the RVCA may be configured to remove certain details from a first video, or reduce the amount of video (e.g., frames, seconds) that include the first topic for the first user. Continuing the example, a second user may be a viewer of content that has a below average understanding of a second topic. Based on identifying the second topic, the RVCA may be configured to add additional details (e.g., additional text, increased details, avatars explaining the second topic) to the first video, or increase the amount of video (e.g., frames, seconds) that include the second topic for the second user.

In some embodiments, the RVCA may augment the video with a virtualized avatar ("avatar"). The avatar may be a character rendered through computer animation or computer graphics. The RVCA may use a process to insert the avatar into the video, such that it appears the avatar is a teacher that is teaching the various topics in the video. For example, the RVCA may perform an image analysis technique and/or machine learning techniques to analyze and alter the video (e.g., generative adversarial networks ("GANs")) to modify or alter a video. The alteration may include, removing certain content, such as removing fixed display of text and replacing the fixed text with text that is drawn in by the avatar.

RVCA may also reduce the use of computing resources. Specifically, utilizing RVCA may reduce the number of videos and other content that is hosted by a service provider. For example, before RVCA, a content creator may create and pay for the hosting costs associated with hosting three videos related to a topic. The three videos may contain a basic, general, and advanced version of the topic and may be directed at viewers that have varying levels. Each of the three videos may consume many gigabytes of storage costs. Further, users may spend excessive network resources viewing parts of each video before determining a video that is close to their learning style. However, RVCA may eliminate storage and network issues—and provide a practical solution to providing varying detail levels from a single video.

The RVCA may also expand the usefulness of a video by generating a video for a variety of audiences and may eliminate various versions of videos that were previously necessary for the differing experiences and skills of audiences. In detail, given any fundamental, basic or complex lesson, and assignment with required learning outcomes, RVCA may tailor video content for viewers to represent their learning in different ways (or different levels) depending on their needs. RVCA may also be beneficial for education. For instance, in an elementary, high school, university, medical, legal, or other professional school, students may vary in skills and knowledge. The varying skills and knowledge of the students may lead to situations where even two or three fixed versions of a topic may not adequately enable students to learn and comprehend the information.

The RVCA may tailor video content for each student that accesses the video differently depending on their varying skills and knowledge. In one example, the RVCA may toggle the overlay of additional details (or remove certain details) for particular students based on their age or education level. In another example, the RVCA may alter a video by generating a virtual digital avatar of a schoolteacher that draws out the material for viewing in a step-by-step or linear fashion. The RVCA may also alter the video by generating multiple virtual avatars or teachers. The multiple teachers might be overlayed into the various pieces of educational content to explain the same concepts in various ways for students that may benefit from repeated or varying explanations of the same topic. Advanced students may benefit from the RVCA generating a condensed version of a video. For example, a topic is reduced from many minutes of details showing information linearly, into a summarizing single screen of information on the topic.

The RVCA may tailor video content for each student that accesses the video differently depending on language or understanding differences. The ability to perform synthetic media operations of the RVCA may allow a content creator that does not speak a particular language to generate video content for viewers. For example, the RVCA may generate a video that includes an instructor speaking in a first language, from a video that does not include an instructor and includes an audio track in a second language. The additional of spoken language may replace the originally spoken language or may supplement the originally spoken language.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases
automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
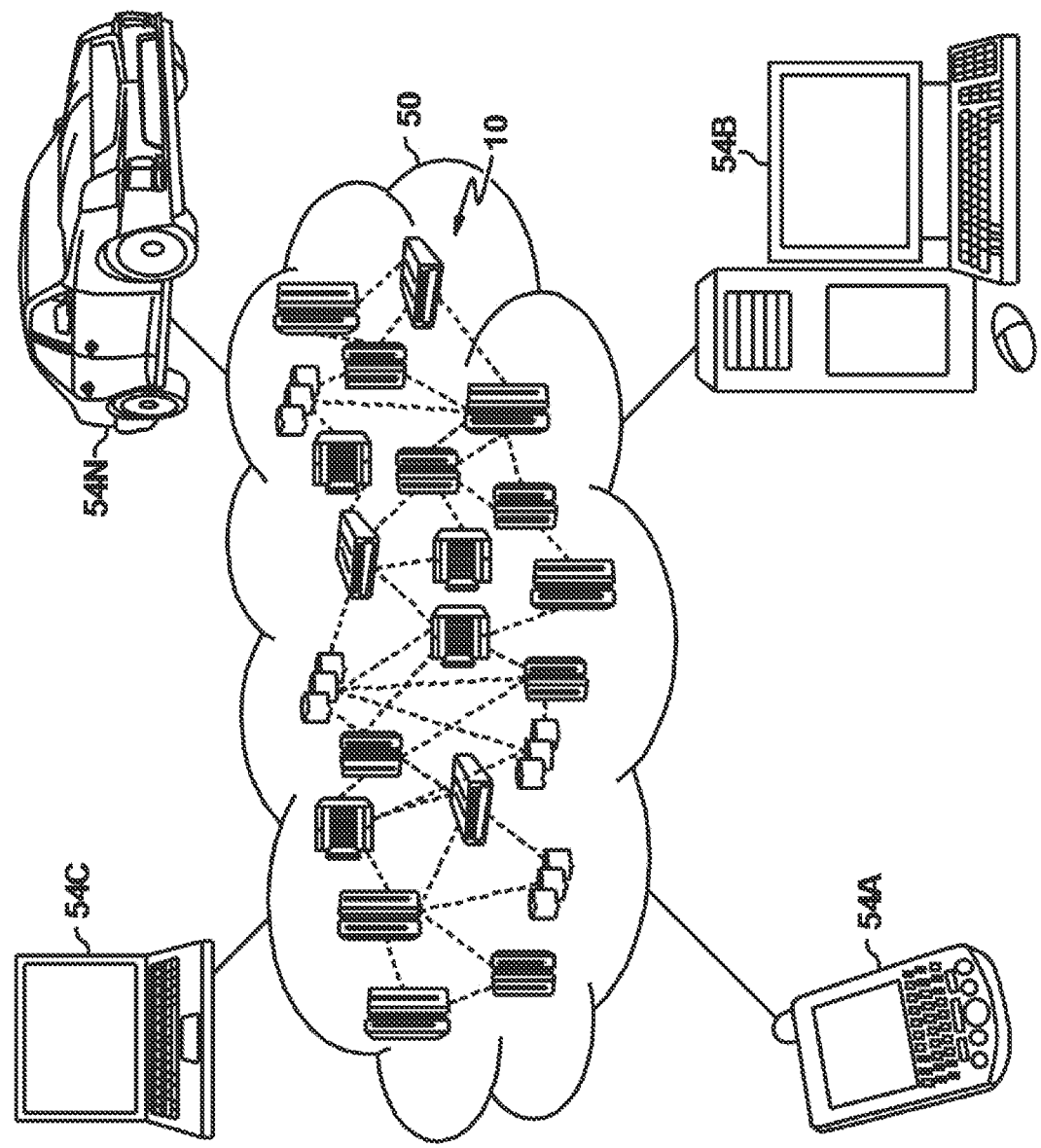
FIG. 2 depicts a cloud computing environment, in accordance with some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
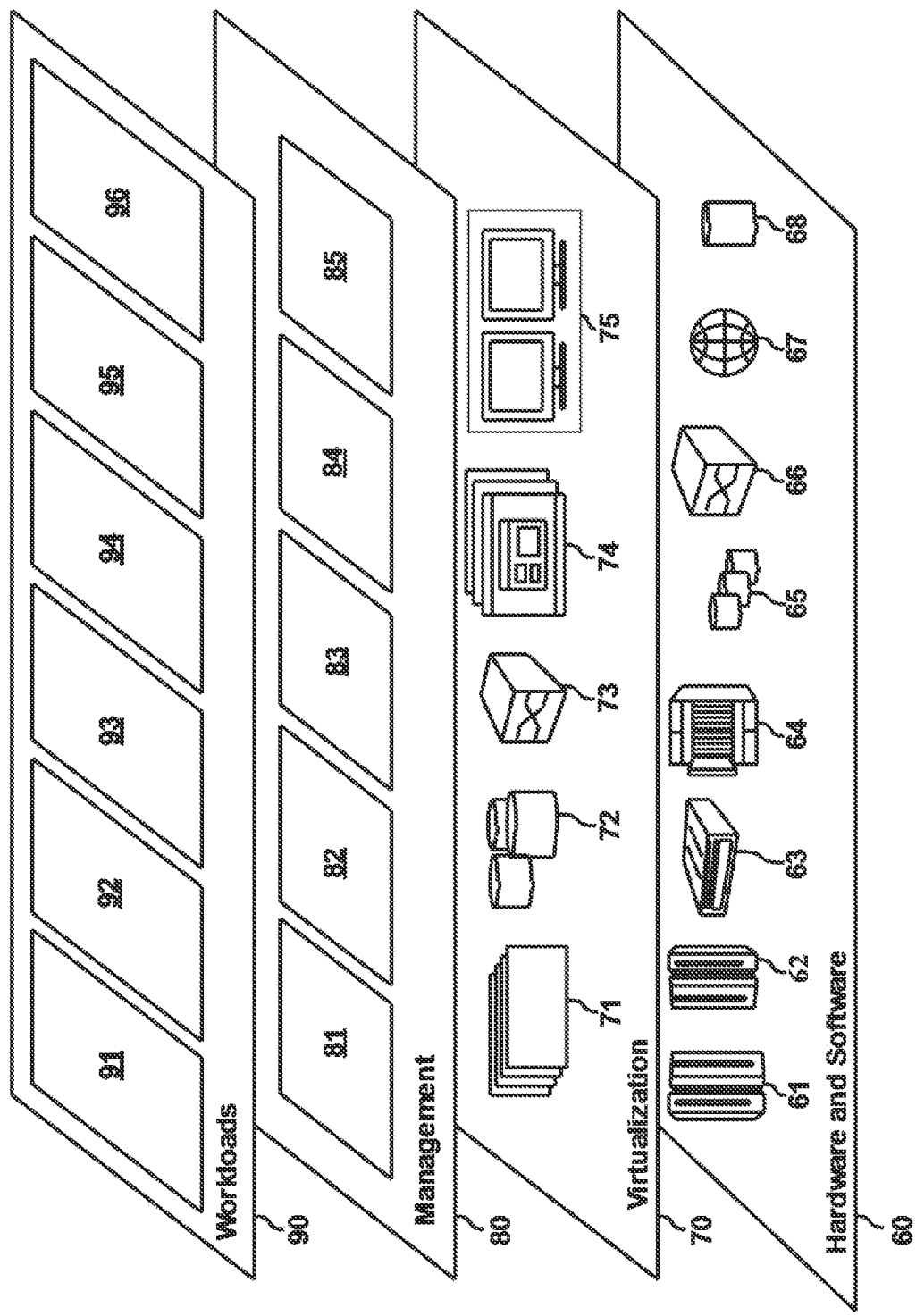
FIG. 3 depicts abstraction model layers, in accordance with some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and RVCA 96.

Figure 4:
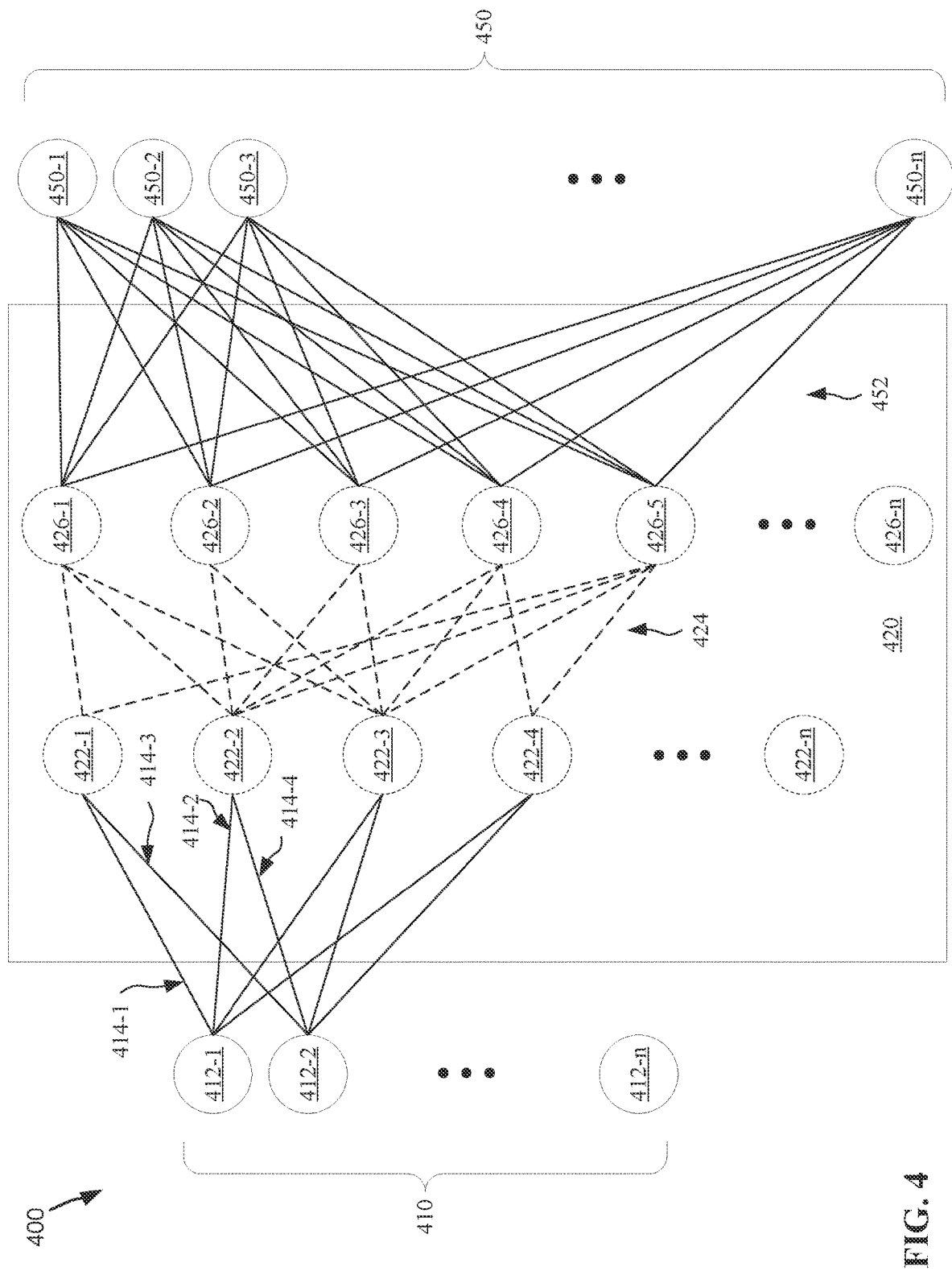
FIG. 4 depicts an example neural network representative of one or more artificial neural networks, in accordance with some embodiments of the present disclosure.

FIG. 4 depicts an example neural network (alternatively, "network") 400 representative of one or more artificial neural networks, consistent with embodiments of the present disclosure. The neural network 400 is made up of a plurality of layers. The network 400 includes an input layer 410, a hidden section 420, and an output layer 450. Though network 400 depicts a feed-forward neural network, it should be appreciated that other neural networks layouts may also be configured to perform RVCA such as a recurrent neural network layout (not depicted). In some embodiments, the network 400 may be a design-and-run neural network and the layout depicted may be created by a computer programmer. In some embodiments, the network 400 may be a design-by-run neural network, and the layout depicted may be generated by the input of data and by the process of analyzing that data according to one or more defined heuristics. The network 400 may operate in a forward propagation by receiving an input and outputting a result of the input. The network 400 may adjust the values of various components of the neural network by a backward propagation (back propagation).

The input layer 410 includes a series of input neurons 412-1, 412-2, up to 412-$n$ (collectively, 412) and a series of input connections 414-1, 414-2, 414-3, 414-4, etc. (collectively, 414). The input layer 410 represents the input from data that the neural network is supposed to analyze (e.g., video content). Each input neuron 412 may represent a subset of the input data. For example, the neural network 400 is provided with a series of values from an image, frame, or set of frames from video content as input, and the series of values is represented by a series of floating-point numbers.

In another example, input neuron 412-1 may be the first pixel of a picture, input neuron 412-2 may be the second pixel of the picture, etc. The number of input neurons 412 may correspond to the size of the input. For example, when neural network 400 is designed to analyze images that are 256 pixels by 256 pixels, the neural network layout may include a series of 65,536 input neurons. The number of input neurons 412 may correspond to the type of input. For example, when the input is a color image that is 256 pixels by 256 pixels, the neural network layout may include a series of 196,608 input neurons (65,536 input neurons for each of the red, green, and blue values of each pixel). The type of input neurons 412 may correspond to the type of input. In a first example, a neural network may be designed to analyze images that are black and white, and each of the input neurons may be a decimal value between 0.00001 and 1 representing the grayscale shades of the pixel (where 0.00001 represents a pixel that is completely white and where 1 represents a pixel that is completely black). In a second example, a neural network may be designed to analyze images that are color, and each of the input neurons may be a three-dimensional vector to represent the color values of a given pixel of the input images (where the first component of the vector is a red whole-number value between 0 and 255, the second component of the vector is a green whole-number value between 0 and 255, and the third component of the vector is a blue whole-number value between 0 and 255).

The input connections 414 represent the output of the input neurons 412 to the hidden section 420. Each of the input connections 414 varies depending on the value of each input neuron 412 and based upon a plurality of weights (not depicted). For example, the first input connection 414-1 has a value that is provided to the hidden section 420 based on the input neuron 412-1 and a first weight. Continuing the example, the second input connection 414-2 has a value that is provided to the hidden section 420 based on the input neuron 412-1 and a second weight. Further continuing the example, the third input connection 414-3 based on the input neuron 412-2 and a third weight, etc. Alternatively stated, the input connections 414-1 and 414-2 share the same output component of input neuron 412-1 and the input connections 414-3 and 414-4 share the same output component of input neuron 412-2; all four input connections 414-1, 414-2, 414-3, and 414-4 may have output components of four different weights. Though the network neural 400 may have different weightings for each connection 414, some embodiments may contemplate weights that are similar. In some embodiments, each of the values of the input neurons 412 and the connections 414 may be stored in memory.

The hidden section 420 includes one or more layers that receive inputs and produce outputs. The hidden section 420 includes a first hidden layer of calculation neurons 422-1, 422-2, 422-3, 422-4, up to 422-*n* (collectively, 422); a second hidden layer of calculation neurons 426-1, 426-2, 426-3, 426-4, 426-5, up to 426-*n* (collectively 426); and a series of hidden connections 424 coupling the first hidden layer and the second hidden layer. It should be appreciated that neural network 400 only depicts one of many neural networks capable of RVCA consistent with some embodiments of the disclosure. Consequently, the hidden section 420 may be configured with more or less hidden layers (e.g., one hidden layer, seven hidden layers, twelve hidden layers, etc.)—two hidden layers are depicted for example purposes.

The first hidden layer includes the calculation neurons 422-1, 422-2, 422-3, 422-4, up to 422-*n*. Each calculation neuron 422 of the first hidden layer may receive as input one or more of the connections 414. For example, calculation neuron 422-1 receives input connection 414-1 and input connection 414-2. Each calculation neuron 422 of the first hidden layer also provides an output. The output is represented by the dotted lines of hidden connections 424 flowing out of the first hidden. Each of the calculation neurons 422 performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, 0.671, etc.) and calculating a single non-binary output (e.g., a number between 0 and 1, a number between −0.5 and 0.5, etc.). Various functions may be performed to calculate the activation function (e.g., a sigmoid neurons or other logistic functions, tanh neurons, softplus functions, softmax functions, rectified linear units, etc.). In some embodiments, each of the calculation neurons 422 also contains a bias (not depicted). The bias may be used to decide the likelihood or valuation of a given activation function. In some embodiments, each of the values of the biases for each of the calculation neurons is stored in memory.

The neural network 400 may include the use of a sigmoid neuron for the activation function of calculation neuron 422-1. An equation (Equation 1, stated below) may represent the activation function of calculation neuron 412-1 as f(neuron). The logic of calculation neuron 422-1 may be the summation of each of the input connections that feed into calculation neuron 422-1 (i.e., input connection 414-1 and input connection 414-3) which are represented in Equation 1 as j. For each j, the weight w is multiplied by the value x of the given connected input neuron 412. The bias of the calculation neuron 422-1 is represented as b. Once each input connection j is summed the bias b is subtracted. Finalizing the operations of this example as follows: given a larger positive number of results from the summation and bias in activation f(neuron), the output of calculation neuron 422-1 approaches approximately 1; given a larger negative number of results from the summation and bias in activation f(neuron), the output of calculation neuron 422-1 approaches approximately 0; and given a number somewhere in between a larger positive number and a larger negative number of results from the summation and bias in activation f(neuron), the output varies slightly as the weights and biases vary slightly.

$$f(\text{neuron}) = \frac{1}{1 + \exp\left(-\sum_j w_j x_j - b\right)} \quad \text{Equation 1}$$

The second hidden layer includes the calculation neurons 426-1, 426-2, 426-3, 426-4, 426-5, up to 426-*n*. In some embodiments, the calculation neurons 426 of the second hidden layer may operate similarly to the calculation neurons 422 first hidden layer. For example, the calculation neurons 426-1 to 426-*n* may each operate with a similar activation function as the calculation neurons 422-1 to 422-*n*. In some embodiments, the calculation neurons 426 of the second hidden layer may operate differently to the calculation neurons 422 of the first hidden layer. For example, the calculation neurons 426-1 to 426-*n* may have a first activation function, and the calculation neurons 422-1 to 422-*n* may have a second activation function.

Similarly, the connectivity to, from, and between the various layers of the hidden section 420 may also vary. For example, the input connections 414 may be fully connected to the first hidden layer and hidden connections 424 may be fully connected from the first hidden layer to the second hidden layer 426. In some embodiments, fully connected may mean that each neuron of a given layer may be connected to all the neurons of a previous layer. In some embodiments, fully connected may mean that each neuron of a given layer may function completely independently and may not share any connections. In a second example, the input connections 414 may not be fully connected to the first hidden layer and the hidden connections 424 may not be fully connected from the first hidden layer to the second hidden layer 426.

Further, the parameters to, from, and between the various layers of the hidden section 420 may also vary. In some embodiments, the parameters may include the weights and the biases. In some embodiments, there may be more or fewer parameters than the weights and biases. For purposes of example, neural network 400 may be in the form of a convolutional neural network or convolution network. The convolutional neural network may include a sequence of heterogeneous layers (e.g., an input layer 410, a convolution layer 422, a pooling layer 426, and an output layer 450). In such a network, the input layer may hold the raw pixel data of an image in a 3-dimensional volume of width, height, and color. The convolutional layer of such a network may output from connections that are local to the input layer to identify a feature in a small section of the image (e.g., an eyebrow from a face of a first subject in a picture depicting four subjects, a front fender of a vehicle in a picture depicting a truck, etc.). Given this example, the convolutional layer may include weights and biases, as well as, additional parameters (e.g., depth, stride, and padding). The pooling layers of such a network may take as input the output of the convolutional layers but perform a fixed function operation (e.g., an operation that does not take into account any weight or bias). Also given this example, the pooling layer may not contain any convolutional parameters and may also not contain any weights or biases (e.g., performing a down-sampling operation).

The output layer 450 includes a series of output neurons 450-1, 450-2, 450-3, up-to 450-$n$ (collectively, 450). The output layer 450 holds a result of the analyzation of the neural network 400. In some embodiments, the output layer 450 may be a categorization layer used to identify a feature of the input to the network 400. For example, the network 400 may be a classification network trained to identify Arabic numerals. In such an example, the network 400 may include ten output neurons 450 corresponding to which Arabic numeral the network has identified (e.g., output neuron 450-2 having a higher activation value than output neurons 450 may indicate the neural network determined an image contained the number '1'). In some embodiments, the output layer 450 may be a real-value target (e.g., trying to predict a result when an input is a previous set of results) and there may be only a singular output neuron (not depicted). The output layer 450 is fed from an output connection 452. The output connection 452 provides the activations from the hidden section 420. In some embodiments, the output connections 452 may include weights and the output neurons 450 may include biases.

Training the neural network depicted by neural network 400 may include performing back propagation. Back propagation is different from forward propagation. Forward propagation may include feeding of data into the input neurons 410; performing the calculations of the connections 414, 424, 452; and performing the calculations of the calculation neurons 422 and 426. The forward propagation may also be the layout of a given neural network (e.g., recurrence, number of layers, number of neurons in one or more layers, layers being fully connected or not to other layers, etc.). Back propagation may be used to determine an error of the parameters (e.g., the weights and the biases) in the network 400 by starting with the output neurons 450 and propagating the error backward through the various connections 452, 424, 414 and layers 426, 422, respectively.

Back propagation includes performing one or more algorithms based on one or more training data to reduce the difference between what a given neural network determines from an input and what the given neural network should determine from the input. The difference between a network determination and the correct determination may be called the objective function (alternatively, the cost function).

When a given neural network is initially created and data is provided and calculated through a forward propagation the result or determination may be an incorrect determination. For example, neural network 400 may be a classification network; may be provided with a 128 pixel by 250 pixel image input that contains the number '3'; and may determine that the number is most likely '9' and is second most likely '2' and is third most likely '3' (and so on with the other Arabic numerals). Continuing the example, performing a back propagation may alter the values of the weights of connections 414, 424, and 452; and may alter the values of the biases of the first layer of calculation neurons 422, the second layer of calculation neurons 426, and the output neurons 450. Further continuing the example, the performance of the back propagation may yield a future result that is a more accurate classification of the same 128 pixel by 250 pixel image input that contains the number '3' (e.g., more closely ranking '9', '2', then '3' in order of most likely to least likely, ranking '9', then '3', then '2' in order of most likely to least likely, ranking '3' the most likely number, etc.).

Equation 2 provides an example of the objective function ("example function") in the form of a quadratic cost function (e.g., mean squared error)—other functions may be selected, and the mean squared error is selected for example purposes. In Equation 2, all of the weights may be represented by w and biases may be represented by b of neural network 400. The network 400 is provided a given number of training inputs n in a subset (or entirety) of training data that have input values x. The network 400 may yield output a from x and should yield a desired output y(x) from x. Back propagation or training of the network 400 should be a reduction or minimization of the objective function 'O(w,b)' via alteration of the set of weights and biases. Successful training of network 400 should not only include the reduction of the difference between the answer a and the correct answers y(x) for the input values x, but given new input values (e.g., from additional training data, from validation data, etc.).

$$O(w, b) \equiv \frac{1}{2n} \sum_x \|y(x) - a\|^2 \qquad \text{Equation 2}$$

Many options may be utilized for back propagation algorithms in both the objective function (e.g., mean squared error, cross-entropy cost function, accuracy functions, confusion matrix, precision-recall curve, mean absolute error, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also consequently, the alteration of the neural network 400 may be small in any given iteration. Back propagation algorithms may be repeated for many iterations to perform accurate learning as a result of the necessitated smallness of any given iteration.

For example, neural network 400 may have untrained weights and biases, and back propagation may involve the stochastic gradient descent to train the network over a subset of training inputs (e.g., a batch of 10 training inputs from the entirety of the training inputs). Continuing the example, network 400 may continue to be trained with a second subset of training inputs (e.g., a second batch of 10 training input from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would complete an epoch of the training data. Many epochs may be performed to continue training of a neural network. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained network, too many training epochs may yield overfitting in a trained network, etc.). Further, network 400 may be evaluated to quantify the performance of evaluating a dataset, such as by use of an evaluation metric (e.g., mean squared error, cross-entropy cost function, accuracy functions, confusion matrix, precision-recall curve, mean absolute error, etc.).

Figure 5:
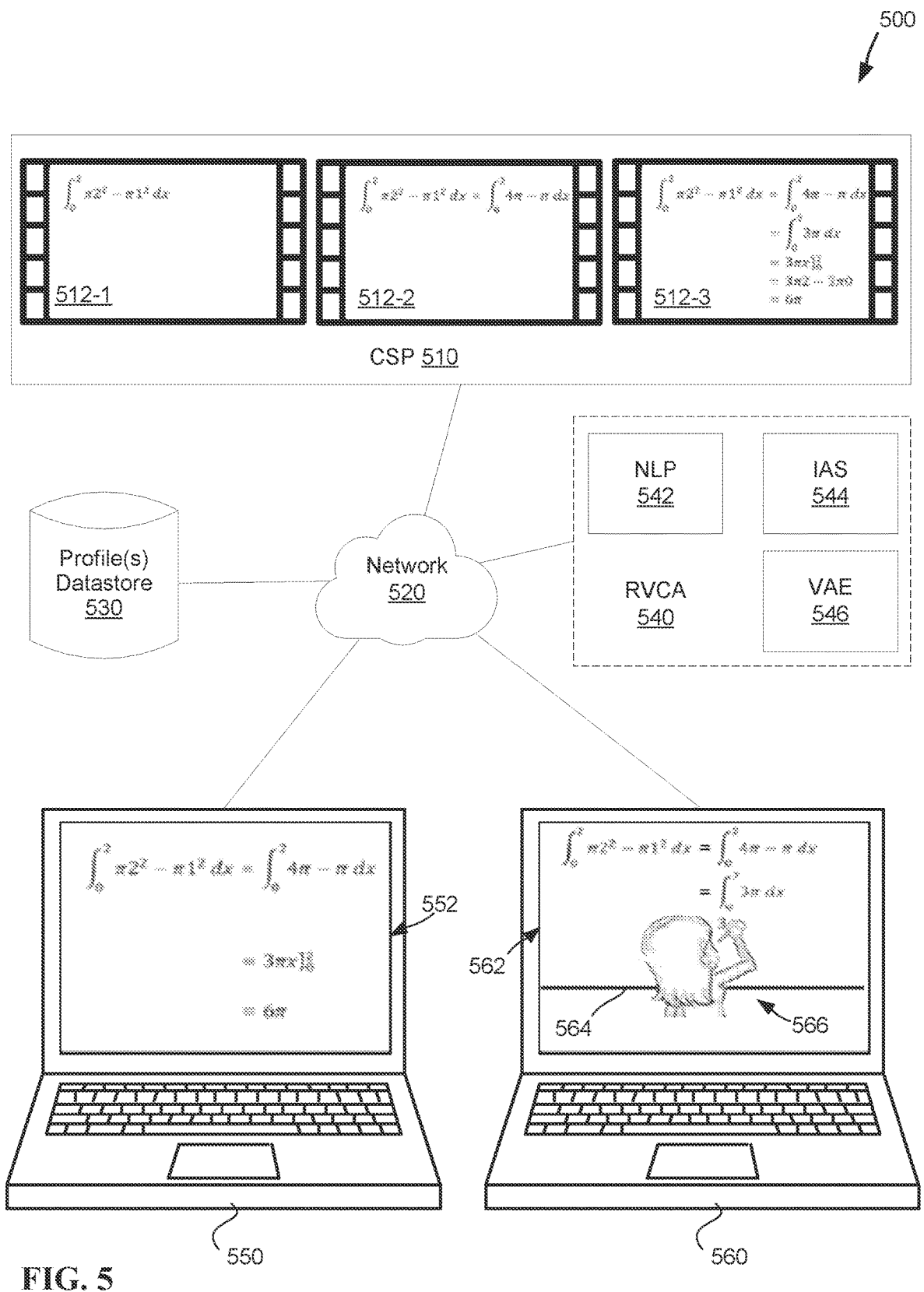
FIG. 5 depicts an example system configured to alter video content, in accordance with some embodiments of the present disclosure.

FIG. 5 depicts an example system 500 configured to alter video content, consistent with some embodiments of the disclosure. System 500 may be configured to alter one or more videos that are provided by a content provider. For example, content service provider ("CSP") 510 may be one or more computing platforms, cloud computing, social media platforms, video conferencing platforms, or other relevant computer system platforms that host and share video created by content creators. CSP 510 may host a video 512 that includes a plurality of video frames including a first set of video frames 512-1, 512-2, and 512-3. System 500 may include one or more of the following components: a network 520 to facilitate communication between distinct entities; a datastore 530 that hosts one or more user profiles; and RVCA 540 configured to perform alterations on video content. System 500 may be configured to provide altered videos to a plurality of clients for consumption by users (not depicted). For example, system 500 may be configured to output to a first client device 550 and a second client device 560.

CSP 510 may operate to proactively classify video content. For example, upon upload of new video content, the CSP 510 may segment the new video content into discrete components, using relevant video segmentation techniques. The CSP 510 may categorize and/or "tag" new video content based on subjects and topics that are discussed in the new video content. The CSP 510 may categorize and/or "tag" new video content based on media type (picture vs. video, vs. presentation slide), and content classification (high-level overview, detailed explanation, example, etc.) The CSP 510 may categorize and/or "tag" new video content based on an analysis that is performed on the new video content. For example, the CSP 510 may pass a newly uploaded piece of video content to the RVCA 540, and the RVCA 540 may transcribe audio and identify/analyze keyword phrases, such as "to provide a quick overview" or "to explain in further detail", for content classification and provide the results of the analysis back to the CSP 510.

Network 520 can be implemented using any number of any suitable physical and/or logical communications topologies. The network 520 can include one or more private or public computing networks. For example, network 520 may comprise a private network (e.g., a network with a firewall that blocks non-authorized external access) that is associated with a particular function or workload (e.g., communication, streaming, hosting, sharing), or set of software or hardware clients. Alternatively, or additionally, network 520 may comprise a public network, such as the Internet. Consequently, network 520 may form part of a data unit network (e.g., packet-based)—for instance, a local-area network, a wide-area network, and/or a global network.

Network 520 can include one or more servers, networks, or databases, and can use one or more communication protocols to transfer data between other components of system 500. Furthermore, although illustrated in FIG. 5 as a single entity, in other examples network 520 may comprise a plurality of networks, such as a combination of public and/or private networks. The communications network 520 can include a variety of types of physical communication channels or "links." The links can be wired, wireless, optical, and/or any other suitable media. In addition, the communications network 520 can include a variety of network hardware and software (not depicted) for performing routing, switching, and other functions, such as routers, switches, base stations, bridges or any other equipment that may be useful to facilitate communicating data.

Profile datastore 530 may include hardware and/or software configured for hosting information about one or more users of system 500. Specifically, datastore 530 may include one or more servers and databases. The datastore 530 may be configured to receive information related to users from client devices, such as first client device 550 and client device 560. The datastore 530 may create incorporate, update, append, remove, delete, or otherwise relate information that is related to a user. For example, a first user (not depicted) may operate first client device 550 and may indicate one or more preferences related to knowledge on various topics. The first user may indicate information that may be stored in datastore 530 directly, such as answering specific questions that are presented to the first user. The first user may indicate information indirectly, such as by various viewing history or usage patterns while watching and listening to content from CSP 510.

The RVCA 540 may be configured to alter video content, and provide altered video content, responsive to users. RVCA 540 may be a combination of hardware and/or software. For instance, RVCA 540 may be a computer system, such as computer 100, configured to process video content from CSP 510. The RVCA 540 may operate as a plurality of computers in an abstracted manner, such as part of cloud computing environment 50. In some embodiments, the RVCA 540 may be a software and/or hardware construct (e.g., such as a program, utility, processor, or the like) embedded in one of the other components of system 500. For example, the RVCA 540 may operate as a component of the CSP 510. In another example, the RVCA 540 may operate as a component a client device, such as a part of the first client 550 or the second client 560. The RVCA 540 may include a plurality of components, such as the following: a natural language processor 542, an image analysis system 544, and a video alteration engine 546.

In some embodiments, the components of the RVCA 540 may execute machine learning (e.g., using neural network 400). The components of the RVCA 540 may use one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The natural language processor 542 may include various components (not depicted) operating through hardware, software, or in some combination. For example, a processor, one or more data sources, a search application, and a report analyzer. The natural language processor 542 may be a computer module that analyses received content and other information. The natural language processor 542 may perform various methods and techniques for analyzing textual information (e.g., syntactic analysis, semantic analysis, etc.). The natural language processor 542 may be configured to recognize and analyze any number of natural languages. In some embodiments, the natural language processor may parse passages of documents or audio and/or video content from videos hosted by CSP 510. For example, the natural language processor 542 may analyze an audio track, closed captions, subtitles, metadata, or other relevant sources of human-understandable language from video 512 hosted by CSP 510.

Various components (not depicted) of the natural language processor 542 may include, but are not limited to, a tokenizer, a part-of-speech (POS) tagger, a semantic relationship identifier, and a syntactic relationship identifier. The natural language processor may include a support vector machine (SVM) generator to process the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., streaming videos). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor 542 may parse a document and generate corresponding data structures for one or more portions of the document. For example, in response to receiving a two-dimensional frame or set of frames of video, the natural language processor 542 may output parsed text elements from the data. In some embodiments, a parsed text element may be represented in the form of a parse tree or other graph structure. To generate the parsed text element, the natural language processor 542 may trigger computer modules including the tokenizer, the part-of-speech (POS) tagger, the SVM generator, the semantic relationship identifier, and the syntactic relationship identifier.

The image analysis system 544 may be a collection of hardware and software, such as an application specific integrated circuit. The image analysis system 544 may be configured to perform various image analysis techniques.

The image analysis techniques may be machine learning and/or deep learning techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the image analysis system 544 may be configured to aid in identifying objects in video content (e.g., text, strings, equations, images, conceptual combinations of text and images, topics, etc.). The image analysis system 544 may identify a particular topic across various portions of a given video content. For example, the image analysis system 544 may identify a common topic (e.g., an equation, derivations of the equation, a diagram, a captioned image that depicts a concept, an explanation including graphs and labels) in frames 512-1, 512-2, and 512-3.

In some embodiments, the image analysis system 544 may identify various objects using an object detection algorithm. The output of the object detection algorithm may include one or more identities of one or more respective objects with corresponding match certainties. For example, a frame 512-1 of video 512 may be analyzed. Using a relevant object detection algorithm, an equation or other relevant topic may be identified in the frame 512-1. In some embodiments, features of the objects may be determined using a supervised machine learning model built using training data. In some embodiments, characteristics of objects may be determined using photogrammetry techniques. For example, shapes and dimensions of objects may be approximated using photogrammetry techniques. As an example, if a user provides an image of a basket, the diameter, depth, thickness, etc. of the basket may be approximated using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as color, size, shape, use, etc., of the object.

The video alteration engine 546 of the RVCA 540 may generate updated or adjusted versions of video content. For example, the video alteration engine 546 may generate altered versions of videos from CSP 510 for a first user that is using the first client 550. In another example, the video alteration engine 546 may generate altered versions of videos from CSP 510 for a second user that is using the second client 560.

The video alteration engine 526 may operate as a combination of hardware and/or software and may perform one or more techniques to generate altered videos, such as synthetic media. For example, video alteration engine 546 may perform machine learning (e.g., an instance of neural network 400) that is configured to perform Autoencoders and/or Generative Adversarial Networks (GAN) to alter video content. The GAN may use deep learning methods, such as convolutional neural networks. The video alteration engine 546 may use the Autoencoders and/or GAN to perform an unsupervised learning task in machine learning to discover regularities or patterns in input data. The video alteration engine 546 can use the regularities and patterns to generate or output new examples that plausibly could have been drawn from the original dataset. The video alteration engine 546 may receive input other than a video. For example, a content creator may be a teacher of students, and the content creator may upload video 512 to the CSP 510. The content creator may also upload an audio-visual sample of themselves. The audio-visual sample may include one or more images and/or video samples of themself (e.g., standing, pointing, talking, smiling, etc.). The video alteration engine 546 may use the audio-visual sample in combination with various hosted videos on the CSP 510 to generate altered versions of videos.

The RVCA 540 may be configured to alter video content based on a user. In one instance, the RVCA 540 may alter content based on user information stored in the profile datastore 530, such as topic familiarity or mastery. For example, increasing or decreasing the detail provided to a given user based on the user information indicating a user may need additional or less information on a given topic. In another instance, the RVCA 540 may alter content based on specific user input from a user. For example, a "skip content" button, "speed up" button, "detailed explanation required" button may be drawn by a user interface of client devices 550 and 560. In response to receiving an input from these buttons, the RVCA 540 may alter video content.

In yet another instance, the RVCA 540 may alter content based on user information received contemporaneously with video consumption, such as from the client devices 550 and 560. For example, the client devices 550 and 560 may have keyboards, microphones, touchscreens, mice, trackpads, touchscreens, cameras, or other relevant input devices. The client devices 550 and 560 may receive questions from the users, such as those typed on the keyboards or spoken audio from the microphones. The client devices 550 and 560 may also relay an appearance of a user from the cameras. The RVCA 540 may use the user information to alter the video content, such as responding to questions from a user, or a confused or disengaged appearance of a user.

In some embodiments, the RVCA 540 may operate to alter a video for a more adept viewer. For example, a user of the first client device 550 may have familiarity or mastery of the topics depicted in video 512. The user may have user information indicative of the experience regarding the topics in the profile datastore 530. The RVCA 540 may alter the one or more frames, including frames 512-1, 512-2, and 512-3, to generate a first altered version 552 for the first user (displayed by the first client 550). The first altered version 552 may include data from one or more of the frames 512-1, 512-2, and 512-3. In some embodiments, the first altered version 552 may be condensed. For example, the first altered version 552 may have a reduced number of frames, a shorter duration, or even a still image, in comparison to the unaltered video 512. The reduced version may include a summarization or still image that skips or omits certain steps.

In some embodiments, the RVCA 540 may operate to alter a video for a more novice viewer. For example, a second user of the second client device 560 may not have familiarity or mastery of the topics depicted in video 512. The second user may have user information indicative of the lack of experience regarding the topics in the profile datastore 530. The RVCA 540 may alter the one or more frames, including frames 512-1, 512-2, and 512-3, to generate a second altered version 562 for the second user (displayed by the second client 560). The second altered version 562 may include additional information, such as reference information, diagrams, pictures, or other depictions not original in the video 512. The second altered version 562 may include frames that depict similar content to the video 512. For example, the RVCA 540 may alter the video 512 by generating the second altered version 562 with additional frames of certain frames or certain sets of frames. Consequently, it may appear that certain topics are video for a longer duration in the second altered version 562.

The second altered version 562 may include a synthetic environment 564, and synthetic or virtualized avatar 566. The altered version may include removing some of the content depicted originally as static information in frames of the video 512 and include newly inserted content. For example, the video alteration engine 526 may generate the virtual avatar 566 as a person that appears to draw the information that was originally depicted as static information in frames 512-1, 512-2, and 512-3. The second altered video 562 may be of a greater length than that of the unaltered version of the video 512. For example, a concept or topic that may be depicted for only a few seconds and may only be depicted in a few hundred frames of video 512 may be expanded many times. The second altered video 562 may have an expanded number of frames that includes tens of thousands of frames of video of the virtual avatar 562. The virtualized avatar 562 may appear to write, point, speak, gesture, pose, or express body language to further demonstrate, articulate, or otherwise explain the topics in the second altered video 562. In some embodiments, only a portion of a video may be altered to include a virtualized avatar, while other portions may not be altered or may be condensed.

The RVCA 540 may generate the virtual avatar 566 based on text in the video or an accompanied audio track, closed-captioned track, or other metadata that is related to video 512 (e.g., tags, filenames, descriptions). The alteration may transform previously static images of concepts or topics in video 512 to animated or moving versions in the second altered video 562. Specifically, it may appear that the characters and symbols are being drawn into the synthetic environment 564 by the virtualized avatar 566. Based on certain levels of knowledge in the profile datastore 530, the RVCA 540 may alter the video 512 to create the second altered video 562 with interactions and pauses. For example, the second altered video 562 may include additional pauses or points where the virtual avatar 566 asks a viewer if they understand and prompts the viewer to respond based on knowledge or lack of knowledge related to the viewer.

The RVCA 540 may update preferences in response to behavior of the user. Specifically, the RVCA 540 may monitor input received from the client devices including the first client 550 and the second client 560. The RVCA 540 may perform historical learning on data, such as by using a relevant machine learning technique. The RVCA 540 may, consequently, identify particular topics, subjects, or concepts that a user does or does not understand as well. For example, if a user hits skip, fast forward, or does not ask questions or pause during a particular section of a given video, the RVCA 540 may update a user profile of the user stored in the user datastore 530. The updates may indicate that in future, the user does not need an alteration that increases the amount or types of explanation. Similarly, if a user pauses, slows down playback, or asks questions to a virtual avatar, the RVCA 540 may update records of the user in the user datastore 530 to indicates that future videos covering the topic may need alterations to increase the description and explanation.

Figure 6:
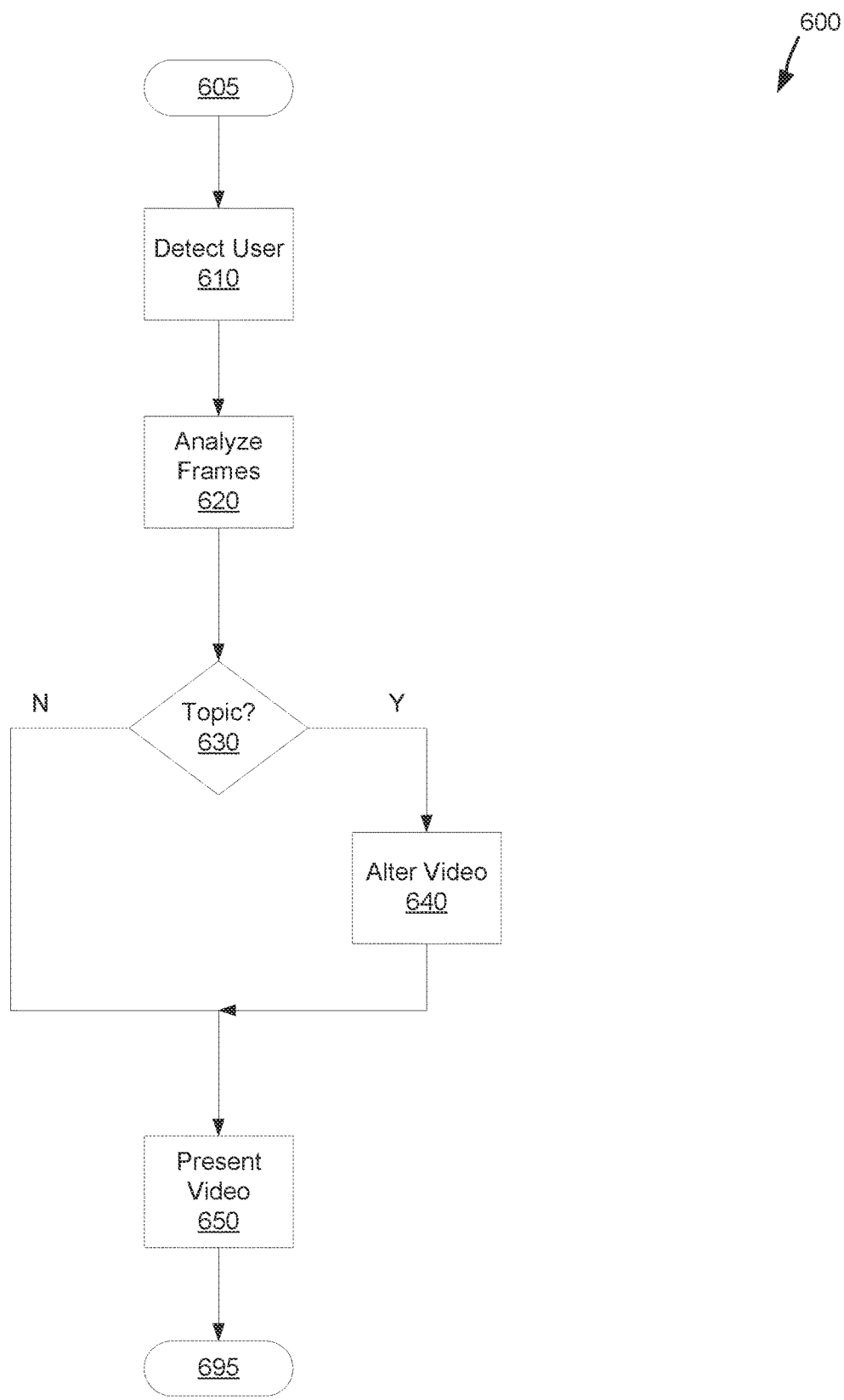
FIG. 6 depicts an example method of altering video content, in accordance with some embodiments of the present disclosure.

FIG. 6 depicts an example method 600 of altering video content, consistent with some embodiments of the disclosure. Method 600 may operate on a computer (e.g., computer 100) or through an abstracted computing platform (e.g., environment 50). Method 600 may operate as part of a system that includes multiple functioning components, such as RVCA 540 of system 500. The method 600 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

From start 605, input from a user may be detected at 610. The input from the user may be directed at video content. For example, the input may be user input that selects a video to be played. The input from the user may be an indication from the user that the user prefers to have the video altered. For example, a user may hit various buttons, such as a "skip content" button, "speed up" button, "detailed explanation required" button, or a "teacher explanation of topic" button for students to interact with in real-time during the video. The input from the user may be one or more values or information from a profile of the user. For example, a user profile may include historical tracking information of past subjects and topics that a user may have consumed. This information may be gathered from one or more components of a system that operates consistently with the method 600, such as CSP 510 and/or RVCA 540 that are configured to obtain, store, and/or analyze viewing history of the user. The information may be gathered passively. For example, CSP 510 may gather a student's personalized information including any viewing or learning preferences of the student. Further, the CSP 510 and/or the RVCA 540 may identify content, like video, image contents, spoken contents, captions, metadata, and the like that may enter a profile of the user and be used as input from the user at 610.

At 620, one or more frames of the video may be analyzed. The analysis of the video may be based on the user input. For example, a portion of the video where the virtual teacher is to be created may be based on a profile/preference of a user from a previous viewing of other videos. The analysis of the video may be based on many users. for example, a portion of a video where many previous users indicate to skip a portion of the video. The analysis of the video may be based on one or more elements of metadata. For example, a video may be previously analyzed (e.g., by a component of system 500) and the metadata may be a part of the analysis. Based on the analysis of the video content at 620, various portions, such as topics or subjects, may be identified—for example, contents in the video that are to be written or drawn by a virtual teacher, and in another example, contents in the video that are to be condensed or summarized.

If a topic is identified at 650:Y, then the video may be altered at 640. The video may be altered by removing, summarizing, condensing, or otherwise shortening a video. For example, information including headings and may key elements from multiple slides of a presentation that covers three topics may be altered. Based on the alteration, all elements that are determined to be key elements may be presented as a single slide for the second of the three topics of the presentation. The video may be altered by generating a virtualized avatar, through a synthetic media technique. The type of virtualized avatar may be generated based on preferences of the user. For example, a particular virtual teacher, that exhibits or utilizes a specific teaching style or technique, may be selected according to the student profile. The virtual avatar may appear as a human being that is configured to move, gesture, point, articulate, and speak.

The virtual avatar may also include other synthetic media, including a virtual environment, such as pencils, pens, a whiteboard, and the like. The virtual avatar may appear to write out topics and subjects of the video that were originally displayed as static content. For example, utilizing relevant machine learning techniques, a virtual avatar may be composited, inserted, overlayed, or replace a static image or images that make up frames or portions of frames of content. The altered version may then include only the virtual avatar drawing frame by frame or step by step (e.g., over a period of twenty seconds), instead of an original version of a frame (e.g., lasting only a second or two).

If a topic is not identified at 630:N (or after the video is altered at 640), then the video may be presented to the user at 650. The video may be presented to a display device of the user, such as a two-dimensional screen, three-dimensional display, or augmented display (e.g., virtual reality or augmented reality display). After the altered video is presented to the user at 650, method 600 may end at 695.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting, from a client device, a first user input, the first user input directed at a video content that includes a set of one or more topics, the first user input being received from a viewer of the video content;
   analyzing, based on the first user input, a set of one or more frames in the video content;
   identifying, based on the set of frames and based on a determined knowledge of the viewer, a first topic in the video content; and
   altering, based on the set of frames and based on the determined knowledge, the video content related to the first topic of the set of topics by removing a frame of the set of frames.

2. The method of claim 1, wherein the altering the video content includes:
   generating a virtualized avatar;
   compositing an updated version of the video content that includes the virtualized avatar;
   determining a first subset of frames of the set of frames that is related to the first topic of the set of topics; and
   creating, based on the first subset of frames and based on the first topic, one or more gestures of the virtualized avatar, wherein the gestures are related to a portion of the first subset of frames that visually depict the first topic, and wherein:
   a portion comprising the frame visually depicts the first topic; and
   the gestures include the virtualized avatar writing the first topic.

3. The method of claim 2, wherein the generating the virtualized avatar is based on a machine learning technique.

4. The method of claim 3, wherein the machine learning technique includes a generative adversarial network.

5. The method of claim 2, wherein the video content also includes an audio narration, and wherein the generating the virtualized avatar includes manipulating a mouth of the virtualized avatar based on the audio narration.

6. The method of claim 1, wherein the analyzing the set of frames includes performing one or more image analysis operations on the set of frames.

7. The method of claim 6, wherein the image analysis operations include a machine learning technique.

8. The method of claim 1, wherein the altering includes inserting additional frames in the video content, wherein additional frames are inserted in the video content near the set of frames that include the first topic.

9. The method of claim 1, wherein the altering comprises:
   determining a first number of frames of the set of frames that corresponds to the first topic;
   removing the first set of frames from the video content;
   generating a new set of frames that include a condensed explanation of the first topic, wherein the new set of frames is less than the first set of frames.

10. The method of claim 1, wherein the altering is further based on a user profile of the viewer.

11. The method of claim 10, wherein the user profile includes a viewing history of the viewer.

12. The method of claim 10, wherein the user profile includes a proficiency level of various topics of the viewer.

13. The method of claim 1, wherein the method further comprises:
   receiving, from the viewer, a request directed at the video content, and wherein the altering the video content is based on the request.

14. A system, the system comprising:
   a memory, the memory containing one or more instructions; and
   a processor, the processor communicatively coupled to the memory, the processor, in response to reading the one or more instructions, configured to:
   detect, from a client device, a first user input, the first user input directed at a video content that includes a set of one or more topics, the first user input from a viewer of the video content;
   analyze, based on the first user input, a set of one or more frames in the video content;
   identify, based on the set of frames and based on a determined knowledge of the viewer, a first topic in the video content; and
   alter, based on the set of frames and based on the determined knowledge, the video content related to the first topic of the set of topics by removing a frame from the set of frames.

15. The system of claim 14, wherein the video content is altered by:
   generating a virtualized avatar;
   compositing an updated version of the video content that includes the virtualized avatar;
   determining a first subset of frames of the set of frames that is related to the first topic of the set of topics; and
   creating, based on the first subset of frames and based on the first topic, one or more gestures of the virtualized avatar, wherein the gestures are related to a portion of the first subset of frames that visually depict the first topic, and wherein:
a portion comprising the frame visually depicts the first topic; and
the gestures include the virtualized avatar writing the first topic.

16. A computer program product, the computer program product comprising:
one or more computer readable storage media; and
program instructions collectively stored on the one or more computer readable storage media, the program instructions configured to:
detect, from a client device, a first user input, the first user input directed at a video content that includes a set of one or more topics, the first user input from a viewer of the video content;
analyze, based on the first user input, a set of one or more frames in the video content;
identify, based on the set of frames and based on a determined knowledge of the viewer, a first topic in the video content; and
alter, based on the set of frames and based on the determined knowledge, the video content related to the first topic of the set of topics by removing a frame from the set of frames.

17. The computer program product of claim 16, wherein the video content is altered by:
generating a virtualized avatar;
compositing an updated version of the video content that includes the virtualized avatar;
determining a first subset of frames of the set of frames that is related to the first topic of the set of topics; and
creating, based on the first subset of frames and based on the first topic, one or more gestures of the virtualized avatar, wherein the gestures are related to a portion of the first subset of frames that visually depict the first topic, and wherein:
a portion comprising the frame visually depicts the first topic; and
the gestures include the virtualized avatar writing the first topic.

18. The computer program product of claim 17, wherein the video content also includes an audio narration, and wherein the generating the virtualized avatar includes manipulating a mouth of the virtualized avatar based on the audio narration.

19. The computer program product of claim 17, wherein analyzing the set of frames includes performing one or more image analysis operations on the set of frames using a machine learning technique.

20. The computer program product of claim 17, wherein the altering includes inserting additional frames in the video content.

* * * * *